INVENTOR.
FRIEDRICH LAA
BY
Frank R. Infani
AGENT

INVENTOR.
FRIEDRICH LAA
BY
Frank R. Trifari
AGENT

Jan. 28, 1964 F. LAA 3,119,574

DEVICE COMPRISING ROTATABLY-ARRANGED FLANGE SPOOLS FOR WINDING AND UNWINDING MAGNETIC RECORDER TAPE

Filed May 12, 1961 4 Sheets-Sheet 3

INVENTOR.
FRIEDRICH LAA

BY

Frank R. Jrifari
AGENT

Jan. 28, 1964 F. LAA 3,119,574

DEVICE COMPRISING ROTATABLY-ARRANGED FLANGE SPOOLS FOR WINDING AND UNWINDING MAGNETIC RECORDER TAPE

Filed May 12, 1961 4 Sheets-Sheet 4

INVENTOR.
FRIEDRICH LAA
BY
AGENT 3,119,574
Patented Jan. 28, 1964

3,119,574

DEVICE COMPRISING ROTATABLY-ARRANGED FLANGE SPOOLS FOR WINDING AND UNWINDING MAGNETIC RECORDER TAPE

Friedrich Laa, Vienna, Austria, assignor to North American Philips Company, Inc., New York, N.Y., a corporation of Delaware Filed May 12, 1961, Ser. No. 125,603
Claims priority, application Austria May 25, 1960
17 Claims. (Cl. 242—55.13)

This invention relates to devices comprising rotatably-arranged flange spools for winding and unwinding magnetic recording tape.

Since magnetic recorder tape, wound on spools, must be recoiled in every use, numerous suggestions have been made for devices intended to facilitate attachment of the beginning of the tape to the spool core. Thus, for example in a known device with flanged spools, the beginning of the tape and, as the case may be, also the end, are provided with connecting pieces which laterally project beyond the width of the tape and beyond the internal distance between the spool flanges which are provided with a recess which extends at right angles the flange surfaces and through also partly penetrates the spool core. After the connecting piece, present at the beginning of a tape, is introduced into the recess, the tape, upon turning the spool, is taken along by the inclined flange edges, led to the spool core and eventually held in the recess of the core. When this recess extends to the flange edges, the connecting piece is, of its own accord, pulled out of the recess in the core and eventually pulled wholly out of the spool when the tape of such a spool is being unwound.

Efforts have also been made to solve the problem of a simplified manipulation with magnetic recorder tapes by completely avoiding insertion of the end of the tape into the spool. Thus two spools, the delivery spool and the take-up spool, are housed in a common envelope, or so-called magazine. Each end of the tape is fixedly secured to one of the spool cores and in operation the tape is coiled from one spool onto the other and vice versa. Such a magazine permits operation with multiple tracks either with coiling and recoiling of the tape, or with reversal of the spools as with the use of separate spools, but manipulation with the tape itself is completely dispensed with. A disadvantage however is that the empty take-up spool is inseparably connected to the filled delivery spool, which requires a large magazine and greater space on the recorder.

To obviate this disadvantage, it has been suggested to house only the spool with the tape supply in a magazine and for the inner end of the tape to be fixedly secured to the spool core. Housing the tape supply alone in a magazine no doubt facilitates housing of the tape in itself and the tape supply is always protected. However, the outer end of the tape supply must again be inserted into a separate take-up spool. To facilitate such insertion, it has been suggested to provide the core of the take-up spool with a starting tape which is connected to the beginning of the tape supply projecting from the supply magazine. The take-up spool itself may again be housed in a magazine. Such a device has the specific disadvantage that not only the couplings for connecting the beginning of the tape to the starting tape are difficult to establish, but also the tape after use must always be coiled back into the supply magazine and that two distinct types of magazines may be required.

The invention relates to a device for tape recorder, dictating machine, data processing and such apparatus with rotatably-arranged flange spools for winding and unwinding a magnetic recording tape, at least one spool having recesses with inclined edges, which extend at right angles through the flange surfaces and through the spool and partly into the spool core and to the flange edges, so that a tape provided at the beginning with a connecting piece laterally projecting beyond the width of the tape and beyond the internal distance between the flanges of the spool, after insertion into one of the recesses is taken along upon turning the spool, led to the spool core and held in position there. According to the invention a wall or wall part (of a cartridge or magazine) is provided with an aperture arranged near at least the one spool provided with the recesses, at least along part of the periphery of the flange. This wall or wall part being positioned relative to the flange edges so that in co-action with resilient elements provided on the wall or the wall part and/or on the connecting piece, the wall or the wall part permits, upon passing the tape through the aperture, that the connecting piece is either urged against the spool flange or inserted in the spool recess, according to the instantaneous position of the recess of the spool.

Particularly effective and advantageous embodiments of the invention, more particularly in the form of a magazine provided with the magnetic recorder tape, relate to the design of the connecting pieces at the ends of the tape, of the resilient elements and of the aperture between the wall parts.

Further embodiments of the invention relate to an arrangement comprising two devices according to the invention, preferably in the form of magazines.

The process of inserting the tape into a spool is fully automated by the invention. It is thus possible to obtain full benefit of the advantages afforded by housing a single tape roll in a magazine without disadvantages, for example attachment of the beginning of the tape to the spool core which cannot be loosened. Also it is no longer necessary to distinguish between supply magazines and take-up magazines. A device according to the invention permits, however, not only to combine the advantages afforded by using a tape which can be loosened from the spools and housing individual spools in magazines, but also creates new possibilities.

Before describing details of the individual particularly effective and advantageous embodiments, the invention will be explained more fully, by way of example, with reference to the accompanying diagrammatic drawings without being limited to the embodiments illustrated therein.

FIGURES 1*a* and 1*b* show a spool known per se such as used in a device according to the invention. FIGURE 1*a* is a plan view of the spool and FIGURE 1*b* is a cross sectional view taken along the line BB of FIGURE 1*a*.

FIGURES 2*a* and 2*b* are partial schematic views showing the principle of operation according to the invention. FIGURE 2*a* shows the relationship just prior to introduction of a tape into a magazine and FIGURE 2*b* shows the tape after insertion in the magazine.

Figure 1A:
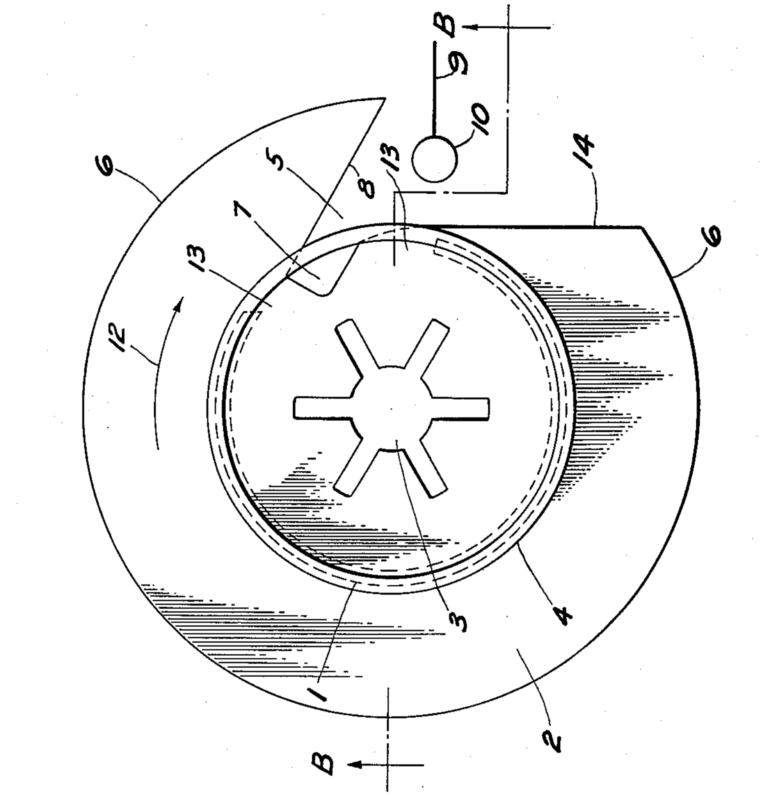
Figure 1B:
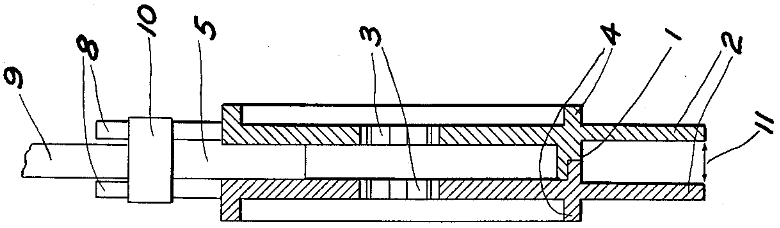

The spool comprises a core 1 and flanges 2, as shown in FIGURES 1*a* and 1*b* having in its central portion, which is placed on the spool table, correspondingly shaped apertures 3 for centering and driving. Provided on the two flanges are guide rings 4 which serve to keep a spool deposited in a magazine approximately in the desired position. The flanges 2 are provided with a recess or slot 5 which extends at right angles through their surfaces. The recess 5 extends on the one hand, to the flange edges 6 and, on the other hand, into the core 1 of the spool. By means of the recess, the flanges 2 are provided with a pair of inclined edges 8. A magnetic recorder carrier (tape) 9 introduced into the recess 5 and provided at the beginning with a connecting piece 10 secured, for example by gluing, which connecting piece laterally projects beyond the width of the tape 9 and beyond the internal distance 11 between the flanges, is taken along by the edges 8, led to the inner end 7 of the recess and held there upon turning the spool in the direction indicated by an arrow 12. On each side of the inner part 7 of the recess, further portions 13 are removed from the core wall which serves to lay on the tape, so that circular winding of the tape onto the core is ensured. The edges 14 located opposite the edges 8 in the spool flanges are in themselves unimportant for attaching the beginning of the tape to the spool core. In shaping the recess it is necessary only to ensure that the edges 14 do not hinder the connecting piece 10 in sliding outwardly when the tape is unwound from the spool.

Figure 2A:
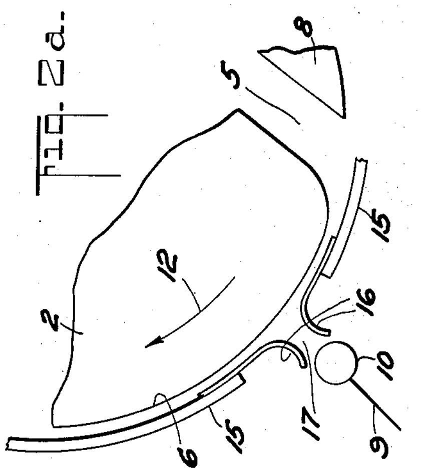
Figure 2B:
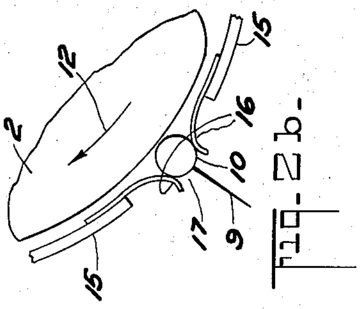
Figure 9:
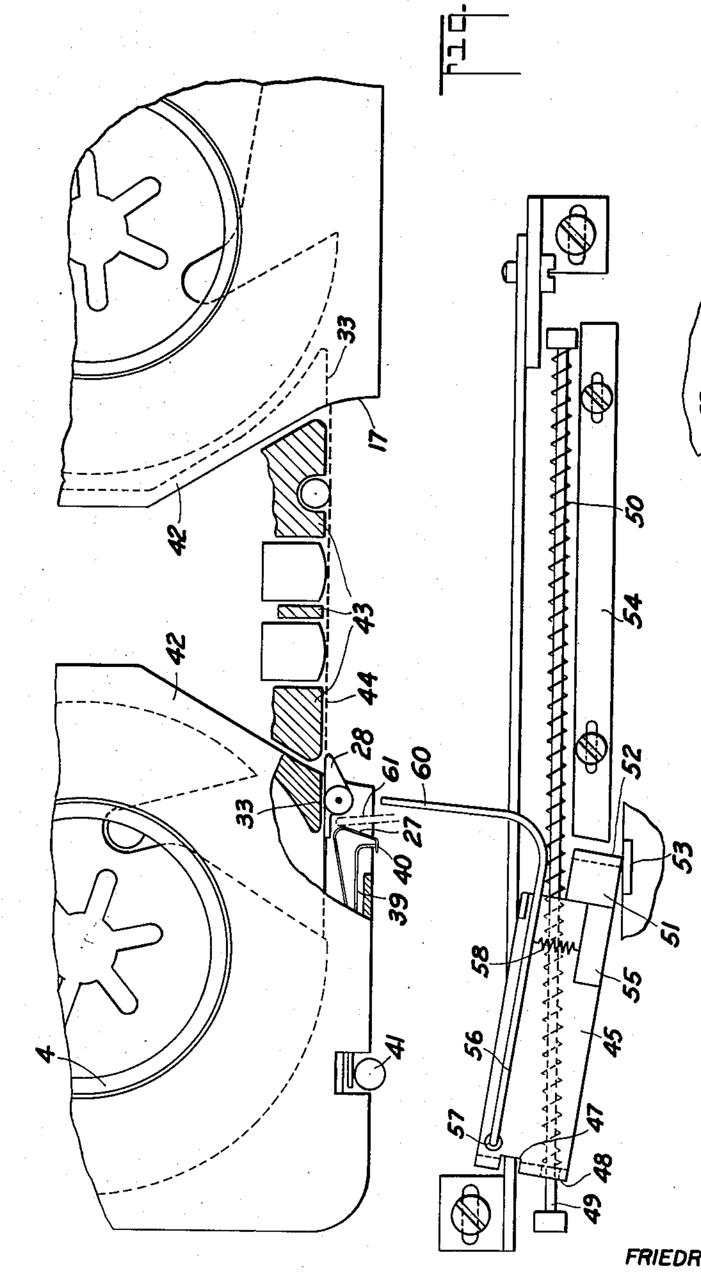
FIGURE 9 is a partial plan view which shows a tape recorder according to the invention with the parts illustrated shown in their starting position.
Figure 10:
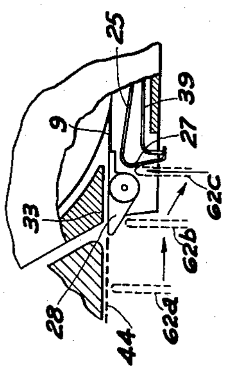
FIGURE 10 is a partial sectional plan view which shows details of another of said positions.

In the embodiment of the device according to the invention shown in FIGURES 2*a* and 2*b*, showing only a part of the peripheries of the flanges 2 of the spool of FIGURES 1*a* and 1*b*, there are provided wall parts 15, adjacent the periphery of the spool flanges, and which are located on a plate or spool table below the spool 2 (not shown). In a recorder reproducer such as illustrated in FIG. 9 the parts 15 could be formed integral with, or secured directly on the tape deck. The wall parts 15 form, together with resilient elements 16 secured thereto and formed as springs, an aperture 17 of a size such that the dimension of the connecting piece 10 provided on the tape is larger than the width of the aperture 17. The resilience of the springs 16 makes it possible, however, to push the piece 10 into the aperture and through it. If the recess 5 is not located exactly behind the aperture 17, the piece 10 is pushed by the springs 16 against the edges of the spool flanges 2 (FIGURE 2*b*). If, now, the spool is turned in a direction indicated by arrow 12, the recess 5 at a given moment comes to lie behind the piece 10; the springs 16 then push the piece 10 into the recess 5 and the edges 8 thereof take the piece 10 along and hence the tape 9, until the piece 10 lies in the spool core. If the spool directly has a position such that the recess 5 lies behind the aperture 17, the piece 10 is brought into the recess 5 by the springs 16 immediately after being passed through the aperture 17. In use of the device it is thus not necessary to pay attention to the position of the spool. The whole manipulation with the tape consists in pushing the piece 10 into the aperture 17. Insertion of the tape into the spool is effected automatically as soon as the spool is turned. The aperture 17 is naturally bounded, which is not specially shown in FIGURES 2*a* and 2*b*, either upwards or downwards, or in both directions, in order that the piece 10 after being pushed in evenly engages the two flanges.

When the tape wound onto the spool is unwound again, the spool is turned in the opposite direction to the arrow 12. The beginning of the tape with the piece 10 eventually slides out of the recess 5 and can also emerge through the aperture 17 upon pulling the tape 9.

Figures 3, 5, 6, 7, 8:
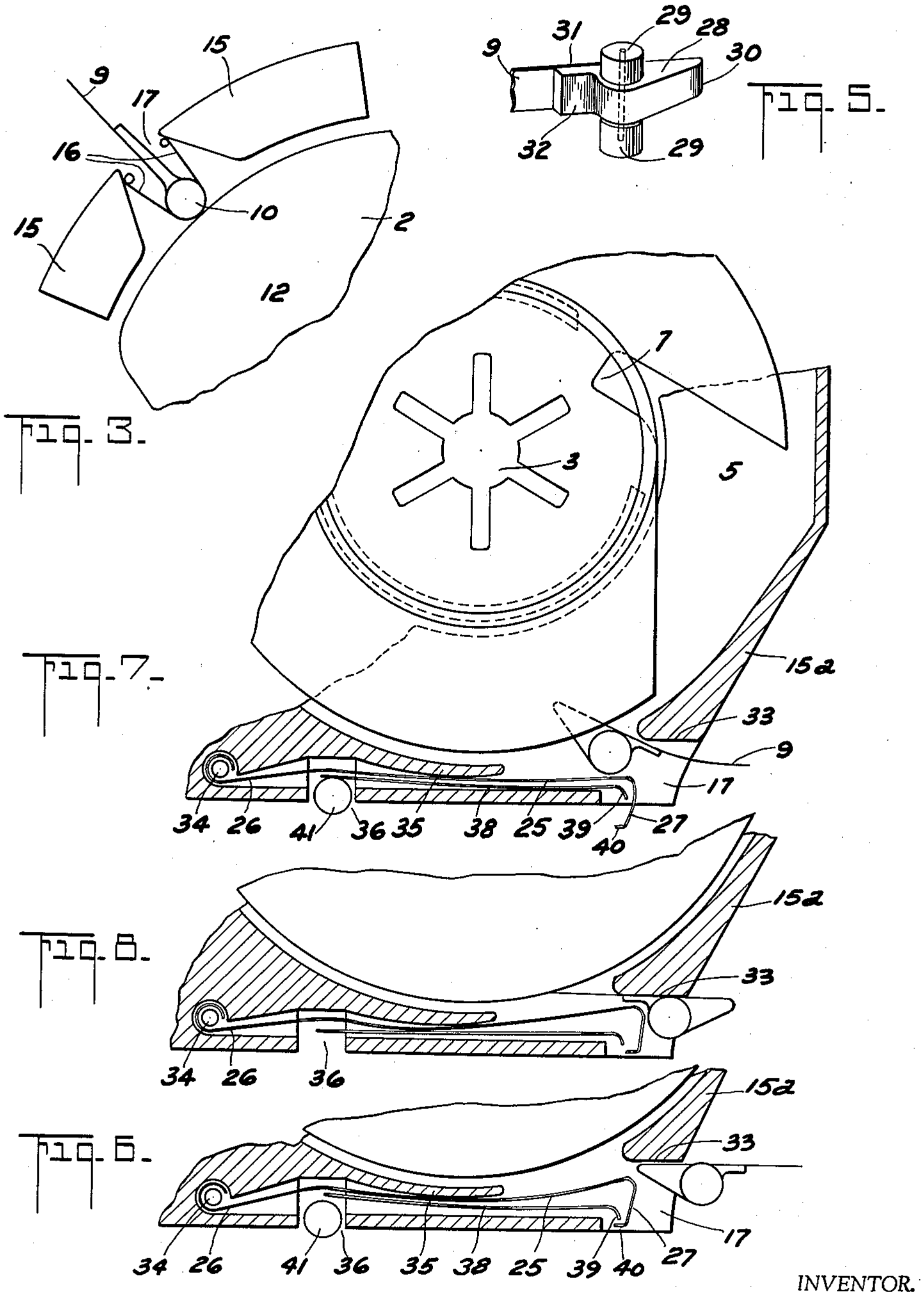
FIGURE 3 shows a variant of the resilient elements illustrated in FIGURE 2.
FIGURE 5 is a perspective view of a particularly advantageous form of the tape connecting piece.
FIGURES 6, 7 and 8 are partial sectional views showing several operative positions of a connecting piece as illustrated in FIGURE 5 relative to a magazine as seen in FIGURE 4.

The wall parts 15, the resilient elements 16 and the aperture 17 may be extended to form a magazine surrounding the whole spool, or may be housed in a magazine. However, especially in this case it must be avoided that the connecting piece provided at the end of the tape is pulled through the aperture 17 and disappears in the magazine. The two ends of the tapes are therefore preferably provided with connecting pieces which are tapered towards the exterior in the axial direction of the tape, for example wedge-shaped, arrow-shaped or the like, so that in co-action with the resilient elements the connecting piece provided at the end of the tape being wound is prevented from entering and passing through the aperture, whereas the nipple provided at the beginning of the tape can pass through the aperture in either direction. The example of such a device shown in FIGURE 3 is at the same time an example where the resilient elements, e.g., the springs 16, may be provided on the tape connecting piece 10 instead of on the wall parts 15. In the device shown, the springs 16 are spread in the rest position so far that this dimension is larger than the width of the aperture 17. The whole is tapered towards the exterior in the form of an arrow in the axial direction of the tape. Consequently, if the piece 10 is present at the beginning of a tape, it may be brought into and through the aperture 17 so that it can be taken along by the edges 8 of the spool flanges 2, but if present at the end of a tape running into the aperture 17, it cannot penetrate this aperture. On the other hand, the piece 10 may be removed from the spool by pulling the tape 9. Instead of providing springs on the piece 10, it is also possible to make the piece 10 of resilient material in a shape tapered towards the exterior.

Figure 4:
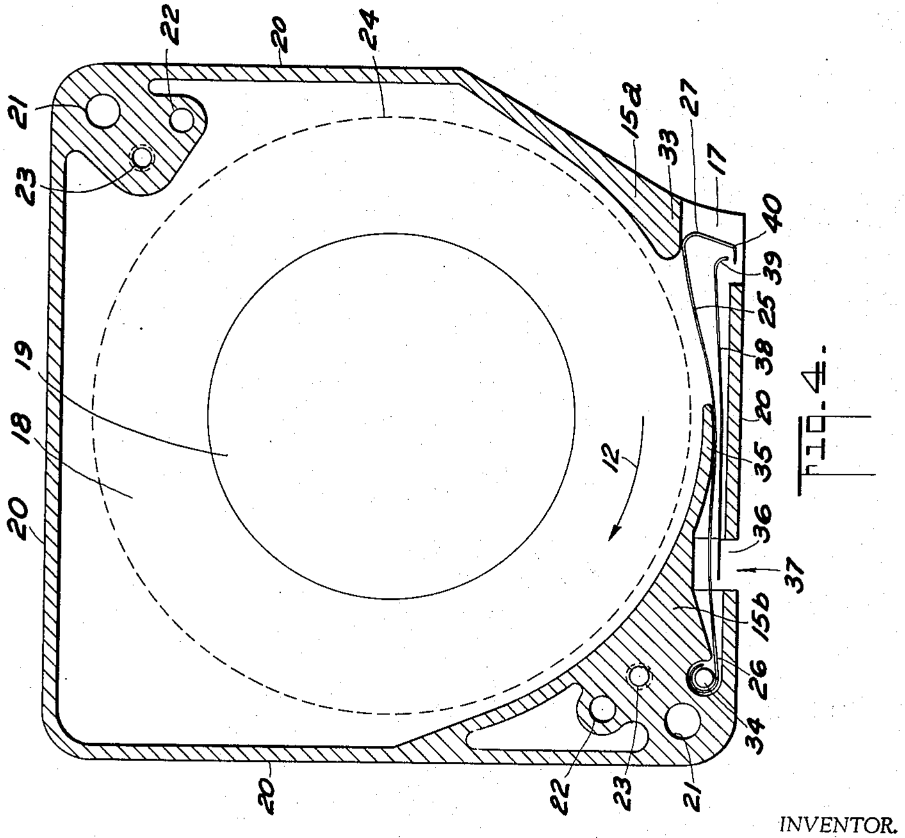
FIGURE 4 is a cross section through one-half of a device and according to the invention use as a magazine comprising two identical halves (the interior of one magazine half being shown).

FIGURE 4 shows a particularly advantageous embodiment of a device according to the invention in the form of a magazine. The magazine housing comprises two identical halves, the interior of one half being shown. Despite the figure not being a cross-section, the magazine parts, for example the parts forming the side walls, which are at right angles to the spool surface, are cross-hatched for the sake of clarity. The spool employed is again a spool as shown in FIGURES 1*a* and 1*b*. Walls 18 parallel to the spool flanges have a central aperture 19 the diameter of which is a little larger than that of the guide wings 4 of the spool. Side walls 20 have a height such that, after joining together the halves, the internal distance between the walls 18 is a little larger than the external distance between the two spool flanges 2. The spools are thus fixed only approximately in their position in the magazine housing, the ultimate relative position of housing and spool being determined only by laying the magazine on a recorder and hence laying the spool on the spool table. Apertures 21 serve to accommodate pins on the recorder by which the magazine in the recorder is fixed in position and locked against torsion. The two housing halves may be joined together by means of pins 22 and screws 23. A broken line 24 indicates the position of the peripheries of the spool flanges 2 when the magazine has been laid on the recorder.

A device in which the wall parts 15 with the aperture 17 and, as the case may be, the resilient elements 16 (FIGURES 2*a*, 2*b* and 3) are arranged in such a magazine or form parts thereof is not shown by a separate figure.

As previously mentioned, FIGURE 4 shows particularly efficacious embodiments of a device according to the invention in the form of a magazine, but it is to be noted that these embodiments are not bound to a magazine. That is, in accordance with the invention the aperture and the parts defining the aperture are not necessarily parts of a magazine. These parts may be incorporated or secured to the tape deck supporting the spools of a magnetic recorder, thus, the spools need not be housed in a magazine in practicing the invention. In how far use will be made of individual or several or all of the details of FIGURE 4, with or without a magazine, is dependent upon the conditions prevailing or to be fulfilled.

The wall parts indicated by 15*a* and 15*b* in FIGURE 4, together with the aperture 17, are wholly identical in operation with the equally numbered elements of FIGURES 2*a*, 2*b* and 3. In a preferred embodiment of the device according to the invention, rigid bodies are provided as tape connecting pieces and the wall part adjoining the aperture 17 is formed by a spring plate 25 arranged adjacent the periphery 24 of the spool and secured at one end 26 in the device, the free end of the spring plate, which is provided with a lug 27 bent away from the spool, limits the aperture to a dimension smaller than the maximum thickness of a connecting piece. If an embodiment of the device in the form of a magazine is concerned, the spring 25 is secured in the simplest way, as shown, by laying it in the recess which is left between the wall part 15*b* and the outer wall 20 and which extends, for example, to the wall 18. The width of the spring 25 is merely chosen a little smaller than the internal distance between the walls 18.

The tape connecting pieces advantageously used are bodies as shown in FIGURE 5. Wedges 28 of synthetic material having a width equal to that of the tape 9 are provided on each side of their thick end with a cylindrical extension in the form of an easily rotatable roller 29. The tape 9 is secured by gluing to a surface 31 which forms part of the wedge and which is extended beyond the thick end of the wedge remote from edge 30 in the form of a thin plate 32. This minimizes the friction between the tape connecting piece and the spool flanges when said piece is urged against the rotating spool by the spring 25. The fixed wall part 15*a* of the device, which bounds the aperture 17, is preferably provided with a guide surface 33 (FIGURES 4 and 6 to 10), extending approximately tangentially to the periphery 24 of the spool, for either the wedge surface 31 secured to the tape, or for the tape 9 itself and by which the free end 27 of the spring plate 25 is supported when fully biased. Thus, a connecting piece provided at the beginning of a tape to be wound and tapered towards the exterior, more particularly one as shown in FIGURE 5, is guided upon introduction into the aperture, but also the connecting piece present at the end of a tape which has been wound is blocked from entering the magazine (FIG. 8), which is important more particularly for a magnetic tape magazine.

The steps described hereinbefore in the structure of the wall parts, of the resilient element and of the connecting pieces on the tape may be applied in the same manner to devices with or without magazines.

With a magazine it also affords advantages, as shown in FIGURE 4 and also in FIGURE 6, if between the free end 27 of the spring plate and its fixed extremity 26, which is preferably pivotal, for example about a pin 34, a surface or tongue 35 is provided for supporting the spring on the side of the spool and between the supporting surface 35 and the fixed extremity 26, the spring plate is led freely through a recess 36 in the magazine, which extends to the edge thereof, so that by means of pressure exerted upon the spring plate 25 in the direction indicated by an arrow 37, the free end 27 of the spring plate 25 may be lifted off the guide surface 33 or its pressure on the guide surface 33 may be reduced. The supporting surface 35 may be formed in itself by corresponding shaping of the wall part 15*b*, but it is advantageous to provide a pin in the wall part 15*b* for strengthening (FIGURE 4).

In addition, a strip 38 of non-deformable material is provided which engages the spring plate 25 on the side remote from the spool 24 and one end 39 of which is supported by a lug 40 of the biassed free end 27 of the spring plate, its other end extending into the recess 36. The strip 38 is, in principle, not necessary for causing the end 27 to be lifted off the guide surface 33 by pressure upon the spring 25 in the direction indicated by arrow 37. However, the presence of the strip 38 makes fully independent of tolerances in the shaping and in the material of the spring 25.

The pressure in the direction indicated by arrow 37 may be exerted, for example, as shown in FIGURE 6, by providing the recorder on which the magazine is laid, with a pin 41 against which the magazine must be pushed to permit it to be positioned with its apertures 21 on the pins present in the recorder.

From FIGURE 6 it also appears how easily a connecting piece according to FIGURE 5 at the beginning of the tape may be introduced into a magazine placed on a recorder. FIGURE 7 shows the position which the beginning of the tape occupies after it has been introduced into and passed through the aperture 17.

A connecting piece present at the end of an in-running tape (FIGURE 8) cannot penetrate the aperture 17, but is locked by the lug 27, since the thick end of the wedge cannot push away the lug 27 even in a shape thereof as shown for a magazine placed in position (FIGURE 6). When the magazine is removed from the recorder (FIGURE 8), the spring 25 pushes the tape 9 or the plate 32 of the connecting piece against the guide surface 33, thus retaining the outer end of the tape. Upon placing the magazine on a recorder, the free end 27 occupies the position shown in FIGURE 6 and releases the end for manipulation.

It will be evident that the provision of two devices or magazines of the embodiment described considerably facilitates manipulation of the tape, since the whole task of the operator consists in pushing the connecting piece present at the beginning of the tape into the aperture of the device containing the take-up spool. However, it is also possible completely to automate this process by means of a corresponding design of the recorder.

FIGURE 9 shows an example of such a recorder. The two devices, magazines 42 are arranged so that their guide surfaces 33, together with wall parts 43 provided on the recorder, form a slide track which also includes the shaft for the tape drive and the sound heads. A slide 45 is slidable on a guide rail 46 parallel to a slide track 44 and adapted to swing towards this track. The slide 45 has the shape of a U which is placed on the rail 46 with the aid of a slot 47 provided in its transverse portion. This transverse portion also has an aperture 48 which allows the passage of a rod 49 provided parallel to the guide rail 46. The rod 49 carries a spring 50 which not only keeps the slide 45 in its left-hand final position away from the slide track 44, but also restores the slide to its left-hand final position when it has been displaced to the right. A lower limb 51 of the slide 45 is provided with a lug 52 which, together with an abutment 53 on the chassis, determines the rest position of the slide 45. When the slide has swung against the slide track 44 and is moved to the right, the rail 54 guides the lug 52 and the slide 45 is thus maintained in the swung position. A grip 55 provided on the upper U-limb serves to move the slide 45. This slide carries a driving element 56 which is formed, for example, of wire of suitable thickness and is pivotally journalled in two apertures 57 provided one opposite the other in the U-limbs of the slide 45. A spring 58 pushes the element 56 against an abutment 59 on the slide 45. A front end 60 of the driving element 56 is bent downwards. The starting position of the slide 45 at the left-hand end of the rail 46 is determined so that the end 60 of the driving element 56 penetrates between the spring 27 and the wedge 28, and assumes a position 61 upon swinging to a supply magazine, filled with tape, which is laid on the recorder, whereby the wedge 28 present at the beginning of the tape thus engages the spring lug 27 which has already been lifted off the guide surface 33 due to the pressure of the pin 41. If, now, the slide 45 is moved to the right, the wedge 28 is taken along by the driving element 56, led along the slide track 44 to the aperture 17 of the right-hand magazine 42 containing the take-up spool and pushed through. When the grip 55 is released, the slide 45 returns to its initial position by the action of the spring 50.

The arrangement shown in FIGURE 9 not only permits of automatically inserting the tape into the spool if the supply spool is at the left-hand side and the empty take-up spool is at the right-hand side, but also conversely, if the delivery spool is at right-hand side. In fact, if the slide which is present at the left in the rest position is swung and moved to the right, the end 60 of the driving element 56 (FIGURE 10) may slide up a wedge 28, located in the aperture 17, against the action of the spring 58 and penetrate behind the wedge 28 between this wedge and the lug 27 of the spring plate 25 (positions 62*a*, 62*b*, 62*c*). When the grip 55 is released, the beginning of the tape of the supply spool located at the right-hand side is then taken along to the left and introduced into the take-up spool located at the left-hand side. Thus, the operator can completely disregard the question whether the delivery spool is located at the left-hand side or at the right-hand side. In either case he has to perform the same order of movements by the grip 55 namely swinging, moving to the right and releasing.

As a matter of fact, modifications in the devices shown in FIGURES 1 to 10 and in the details thereof are possible within the scope of the invention.

What is claimed is:

1. A refillable magazine for magnetic tape coiled on a spool and having an aperture through which said tape is withdrawn and supplied to said spool, the combination comprising, a flanged spool having an inclined recess in the flanges extending from the flange periphery to the spool core, a connecting piece secured to at least one end of the material to be coiled on said spool, said connecting piece comprising a wedge shaped portion having a width not substantially greater than the width of said tape, said wedge portion having its longitudinal axis extending in the direction of the longitudinal axis of said tape and the base end of said wedge being transverse to said tape whereby the apex of said connecting piece leads the end of said tape to which it is attached, and projecting means transversely of said wedge portion, an aperture in said magazine disposed tangentially relative to said flanged spool and adapted to receive the projecting means of said connecting piece, and resilient means operatively associated with said aperture for urging said connecting piece toward the core of said spool whereby upon rotation of said spool said connecting piece and associated tape are drawn to the core of said spool and said material is wound on said core upon continued rotation of said spool.

2. A magazine according to claim 1 wherein said resilient means comprises a spring plate having one end secured in said magazine, a lug at the free end of said plate bent away from said spool normally closing said aperture and limiting the opening of said aperture to a dimension less than the corresponding dimension of the base of said wedge.

3. A magazine according to claim 1 wherein said projecting means comprise cylindrical members rotatably mounted on said wedge shaped portion and an extension projecting from the base of said wedge portion in the longitudinal direction thereof to which said tape is secured.

4. A magazine according to claim 2 wherein one wall of said magazine defining said aperture coacts with said resilient means to guide said connecting piece through said aperture, said one wall having a surface substantially in a plane tangential with the periphery of said flanged spool, and said resilient means being normally biased into engagement with said wall for closing said aperture.

5. A refillable container for materials coiled on a spool comprising means rotatably supporting a flanged spool within said container, an aperture in said container disposed tangentially relative to said flange, a spring plate member pivotally secured in said container at one end and having a lug bent away from said spool at the other end for closing said aperture, said container having a tongue-like member located between said spool and said spring plate and extending along a substantial length of said spring plate, a recess in said tongue member on the side adjacent said spring member and a second aperture in the side of said container opposite said recess, and means whereby said spring plate may be forced into said recess to move said lug to open said aperture.

6. A container according to claim 5 with the addition of a rigid member adjacent said spring member and rockably supported on the side of said container having said second aperture, said rigid member engaging said lug and extending across at least a portion of said second aperture, and means receivable in said aperture for engaging said rigid member for moving said lug to open said aperture.

7. Apparatus comprising in combination a magnetic tape recorder, reproducer having a supply magazine and a take up magazine, each said magazine having a rotatably supported flanged spool therein, each said flanged spool having an inclined recess in the flanges thereof extending from the periphery of said flanges to the core of said spools, and a tangential aperture in each said magazine, a magnetic tape in said supply magazine having at least one connecting piece held in said aperture against entry into the interior of said magazine, means holding said connecting piece in said aperture, means having a guide surface intermediate said supply and take-up magazines, and means for engaging said connecting piece and moving said connecting piece along said guide surface from said supply magazine into the aperture of said take-up magazine, means in said take-up magazine for urging said connecting piece into the recess of the take-up spool whereby said tape is drawn from said supply spool upon rotation of said take-up spool.

8. Apparatus according to claim 7 wherein said means for engaging said connecting piece and moving it along said guide surface comprises a guide rail parallel with said guide surface, a pivotal slide slidably mounted on said guide rail, and a driving element mounted on said slide whereby said driving element engages said connecting piece when said slide is pivoted toward said guide surface and upon movement of said slide the connecting piece is transferred from one magazine to the other magazine.

9. Apparatus according to claim 8 wherein said driving element is resilient in the plane at right angles to its direction of movement and a spring means is included in operative relation with said slide to return said slide to starting position.

10. In a tape recorder provided with a flanged take-up spool having a slot extending from the periphery of the flanges to the core of said spool, said slot receiving a connecting piece at least at the beginning end of a magnetic tape to be wound upon the take-up spool after the connecting piece has been inserted into the slot, the improvement comprising; means for automatically inserting said connecting piece into said slot, said means including wall parts defining an aperture adjacent the periphery of said spool flange, said aperture opening substantially in a tangential direction relative to the flange periphery of said spool, resilient means operatively associated with said aperture, said resilient means being normally biased to close said aperture and movable to an open position by said connecting piece, said wall parts, connecting piece and resilient means having coacting geometrically configured surfaces whereby said connecting piece is urged by said resilient means in a substantially radial direction toward the axis of said spool.

11. In a tape recorder provided with a flanged take-up spool having a slot extending from the periphery of said flanges to the core of said spool, said slot receiving a connecting piece at least at the beginning end of a magnetic tape to be wound upon said take-up spool after the connecting piece has been inserted into the said slot; the improvement comprising means for automatically inserting said connecting piece into said slot, said means including a wall part adjacent the flange periphery of said take-up spool having a guiding surface for directing a connecting piece along a path substantially tangential to the periphery of said flanged spool and resilient means cooperating with said wall part for urging said connecting piece substantially radially toward the axis of said spool.

12. Apparatus comprising in combinaiton a magnetic tape recorder, reproducer having a supply spool and a take-up spool, each said spool having flanged sides, a slot in the flanges of said take-up spool extending from the periphery thereof to the core thereof, a connecting peice at least at the beginning end of said tape to be wound upon said take-up spool, means for automatically inserting said connecting piece into said slot, said means including wall parts secured on said apparatus adjacent said take-up spool, said wall parts defining an aperture adjacent the periphery of the flange of said take-up spool, said aperture opening substantially in a tangential direction relative to the flange periphery of said take-up spool, resilient means operatively associated with said aperture, said resilient means being normally biased to close said aperture and movable to an open position by said connecting piece, said wall parts, connecting piece and resilient means having coacting geometrically configured surfaces whereby said connecting piece is urged by said resilient means in a substantially radial direction toward the axis of said take-up spool, and means for transferring said connecting piece from said supply to said take-up spool.

13. Apparatus comprising in combination a magnetic tape recorder, reproducer having a supply spool and a take-up spool, each said spool having flanged sides, a slot in the flanges of said take-up spool extending from the periphery thereof to the core thereof, a connecting piece at least at the beginning end of said tape to be wound upon said take-up spool, and means for automatically inserting said connecting piece into said slot, said means including a wall part adjacent the flange periphery of said take-up spool having a guiding surface for directing said connecting piece along a path tangential to the flange of said spool, and resilient means cooperating with said wall part for urging said connecting piece substantially radially toward the axis of said spool and means for transferring said connecting piece from said supply spool to said take-up spool.

14. Apparatus according to claim 13 wherein said means for transferring said connecting piece from said supply spool to said take-up spool comprises a guide, a slide member movably secured on said guide and pivotal with respect to said guide, and a driving element supported on said slide for engaging said connecting piece upon pivotal movement of said slide.

15. Take-up apparatus for strip material having a connecting piece at one end comprising a take-up spool, a pair of side flanges on said spool having an oblique slot therein extending from the periphery of said flanges to the core of said spool, an arcuate wall member spaced from said spool in a plane parallel with the plane of the axis of rotation of said spool and defining an arcuate channel between the peripheral surface of said flanges and the adjacent surface of said wall member, an aperture in said wall member, resilient means and means for supporting said resilient means within said aperture whereby a connecting piece introduced into said aperture is removably held in said channel and urged into the slots of said spool upon rotation thereof past said aperture.

16. Take-up apparatus for strip material having a connecting piece at one end comprising a take-up spool, a pair of side flanges on said spool having an oblique slot therein extending from the periphery of said flanges to the core of said spool, an arcuate wall member spaced from said spool in a plane parallel with the plane of the axis of rotation of said spool and defining an arcuate channel between the peripheral surface of said flanges and the adjacent surface of said wall member, an aperture in said wall member, resilient means connected with said wall member extending into said aperture defining an expandable opening into said channel, said resilient means removably holding a connecting piece introduced into said aperture within said channel and urging said connecting piece within said channel into the slot of said spool upon rotation thereof past said aperture.

17. Take-up appartaus for strip material having a connecting piece at one end thereof comprising a take-up spool, a pair of flanges on said spool having an oblique slot therein extending from the periphery of said flanges to the core of said spool, a wall member spaced from said spool defining a channel tangential with said spool, an aperture in said wall member opening into said channel, resilient means within said channel extending into said aperture defining an expandable opening with said wall member, said resilient means urging a connecting piece introduced into said channel into the slot of said spool upon rotation thereof past said channel.

References Cited in the file of this patent

UNITED STATES PATENTS

| | | |
|---|---|---|
| 1,871,234 | Proctor | Aug. 9, 1932 |
| 2,578,283 | Bornemann et al. | Dec. 11, 1951 |
| 3,006,650 | Ellmore | Oct. 31, 1961 |

UNITED STATES PATENT OFFICE
CERTIFICATE OF CORRECTION

Patent No. 3,119,574 January 28, 1964

Friedrich Laa

It is hereby certified that error appears in the above numbered patent requiring correction and that the said Letters Patent should read as corrected below.

Column 4, line 40, for "wings" read -- rings --; column 10, after line 43, insert the following:

18. A refillable container for materials coiled on a spool and having an aperature through which said material is withdrawn and supplied to said spool, the combination comprising, a flanged spool having an inclined recess in the flanges extending from the flange periphery to the spool core, a connecting piece secured to at least one end of the material to be coiled on said spool, an aperture in said container disposed tangentially relative to said flanges and adapted to receive said connecting piece, and means operatively associated with said aperture when said connecting piece is received therein for urging said connecting piece against the periphery of said flanges and into the said inclined recess whereby upon rotation of said spool said connecting piece and the attached material are drawn to the core of said spool and said material is wound on said core upon continued rotation of said spool.

in the heading to the printed specification, line 10, for "17 Claims." read -- 18 Claims. --.

Signed and sealed this 21st day of July 1964.

(SEAL)
Attest:

ESTON G. JOHNSON
Attesting Officer

EDWARD J. BRENNER
Commissioner of Patents